Sept. 4, 1934.   M. DE LADERRIÈRE   1,972,377
AUTOMATIC DEMULTIPLYING APPARATUS
Filed March 22, 1932   2 Sheets-Sheet 1
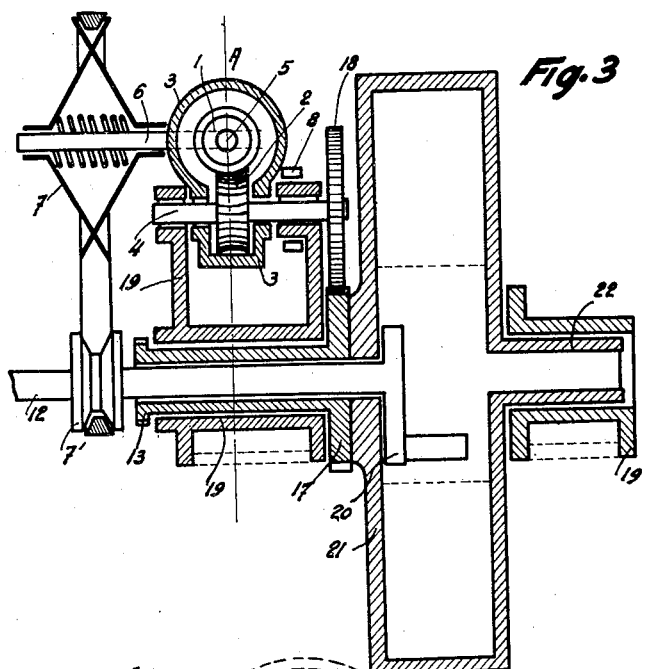
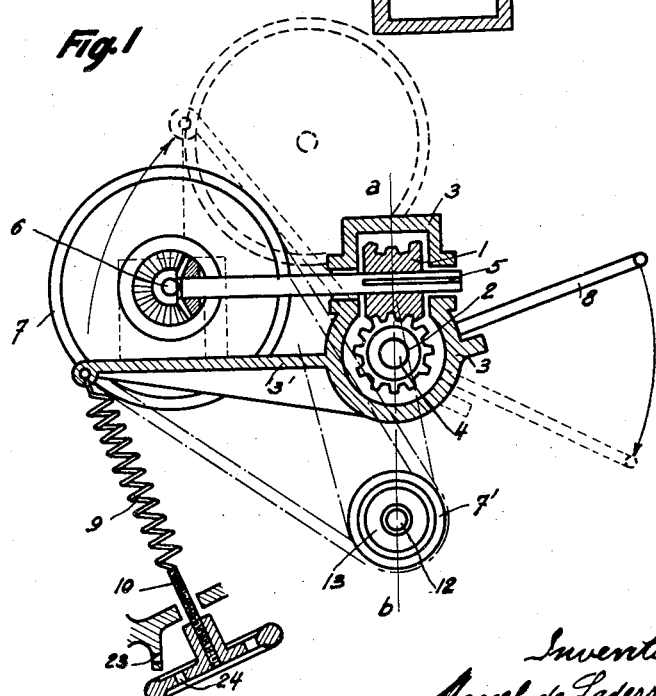

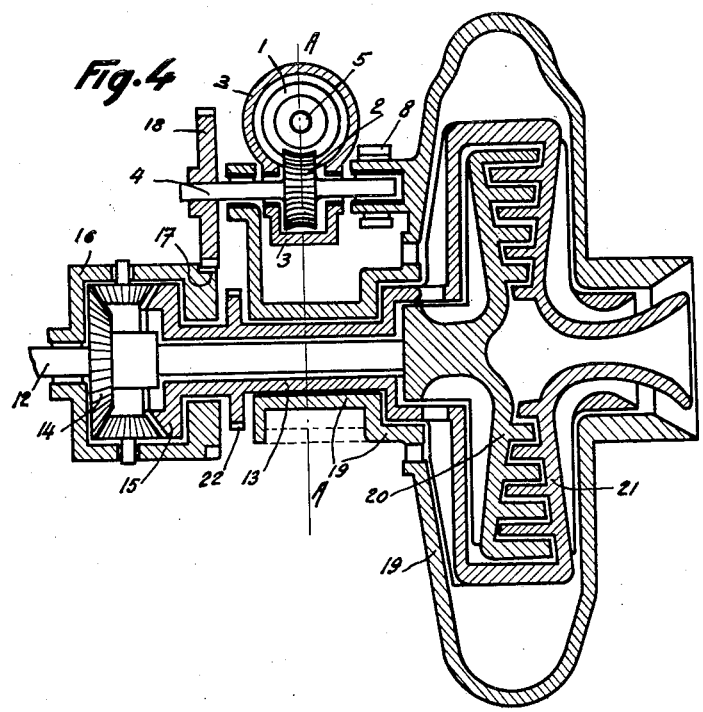
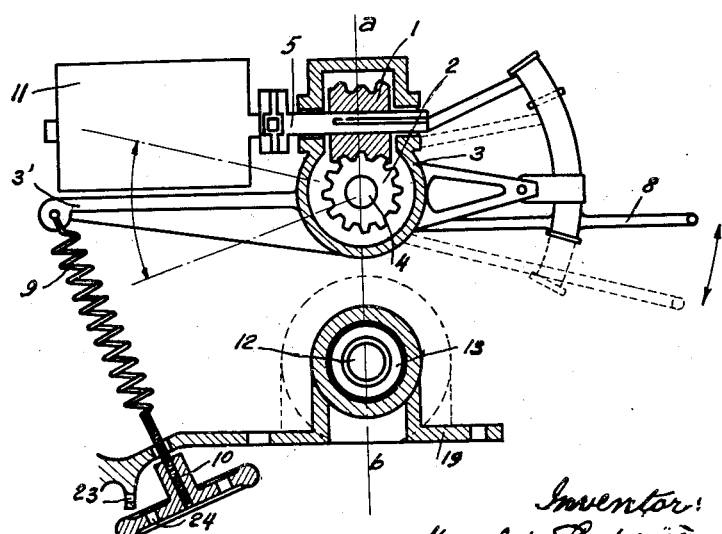

Patented Sept. 4, 1934

1,972,377

UNITED STATES PATENT OFFICE 1,972,377

AUTOMATIC DEMULTIPLYING APPARATUS

Marcel de Laderrière, Cailly, Seine-Inferieure, France

Application March 22, 1932, Serial No. 600,443
In Belgium March 26, 1931

4 Claims. (Cl. 74—7)

Many attempts have been made, chiefly in connection with automobile construction, to obtain, by progressive reduction members with flexibility in the transmission and variation of power, for a given power, a demultiplying ratio in the relation to or in terms of the resistance couple. Said reduction members which served to transmit the whole of the effort, have either been found to be too fragile or of insufficient output.

The present arrangement when combined with the differential gears of motors and turbines having reversing means, permits of assigning to the progressive reduction members only a secondary purpose more appropriate to their nature or to supplement the same by auxiliary means which only indirectly depends on the main motor.

Coupled up to a differential epicyclic train it is also applicable to ordinary motors and will be even more advantageous when there is occasion to interpolate between the driving shaft and the reception shaft an important permanent demultiplication.

The thermic motor with radial cylinders and also the turbine with radial flow and double rotation comprising two concentric shafts, in fact, permit of obtaining scale of speeds which extend over a very wide range for the same motive power by a control exerted on one of the shafts. The accompanying drawings show by way of example:

Figure 1 a side view of the new reducing means with pulley extensible under the action of centrifugal force; Fig. 2 this same reducing means likewise seen in side view, with auxiliary motor; Fig. 3 the application to a radial type of motor having double rotation; Fig. 4 the application to a radial turbine having double rotation.

In its application to a radial type of motor with double rotation, the best conditions of use are obtained when the rotation of the cylinders is relatively slow in normal working whereas the crank can turn very quickly. The cooling of the cylinders is then sufficiently ensured by the speed of displacement of the vehicle. Inversely when the crank, remaining integral in direct drive with the transmission shaft or the reception shaft for instance through the intermediary of a clutch which may be automatic, is obliged by the profile of the road in the application to an automobile or the changes of altitude in the application of the invention to aviation, to transmit the effort from the motor running at reduced speed, the more rapid rotation of the casing more actively concurs to this cooling.

For this purpose the shaft of the casing or external shaft 13 is geared through the intermediary of ordinary gears 17 and 18 and the intermediary of a globical wheel 2 on an endless irreversible screw have globical screw threads 1 of high pitch the casing 3 of which can pivot about the axis 4 of the globical wheel 2 and so be subjected to the reactions of the resistance couple. A counterweight or loaded spring 9 which is adjustable at 10 stabilizes a certain value of the motor couple. When the resistance couple carries it along and breaks this equilibrium the pivoting of the casing modifies the variable ratio coupling represented by way of example by a pulley 7 which is extensible by the action of centrifugal force and which drives the endless screw 1 all the faster as the reaction becomes greater. The driving of the pulleys 7, 7' or of any analogous member (plate and friction rollers, oscillating disk and free wheels) is obtained by coupling, directly or not, to the central shaft 12 of the crank. A lever 8 the axis of which is concentric to the axis 4 of the globical wheel 2 permits of acting on the casing 3 so as to pivot and so start up or accelerate the reducing arrangement each time.

In its application to radical type turbine with double rotation the reducing means can be used as in the previous example but if the two rotors have to turn normally at a speed which is practically equal the reducer will have to turn without stopping which can be avoided by making use of an epicylic train. The central shaft being integralized as previously with the transmission shaft (not shown) the external shaft 13 is connected to it through the intermediary of an epicyclic train with conical pinion wheels 14, 15 or with straight but reversing pinions. The casing 16 of the epicyclic train which bears by means of suitable gear 17, 18 on the irreversible endless screw 1 through the intermediary of the wheel 2 pivots axially which has the result of causing the starting up or the modification of the speed of a small auxiliary electric motor 11, in the example given, (but which may be a thermic motor, compressed air motor, exhaust gas burner enlarged power units). The screw 1 is thus driven all the quicker as the reaction is greater. The variations in speed of the auxiliary motor 11 is obtained by appropriate commands suitable for the motor being used and acting upon its feed supply. The shaft 13 which bears through the casing carrying the satellites 16 on the screw can turn all the quicker as its bearing point increasingly moves away and proportionately lowers the speed of the central shaft 12. The relative speed of the outflow of the gases remaining unchanged the power developed by the turbine remains practically constant for a given value of the load on the spring 9 the tension of which is adjustable at 10.

In the case where a reducing member with variable elements similar to that shown in Figures 1 and 3, is used, its drive would be ensured by a pinion fast on the external shaft 22. This same pinion wheel would also drive the auxiliary members such as dynamo, air compressor and so on. The demultiplying arrangement coming into action as soon as the ratio couple motor-couple resisting exceeds a certain load for which it has been adjusted constitutes in itself a limit of safety of speed. It will be sufficient to seal at 23, 24 the regulating parts so that the driver cannot drive the vehicle at a higher speed.

When the motor is provided with an auxiliary motor it is sufficient to start up the latter to cause the reducing means to start up one of the rotors or the motor.

Applied to motors or ordinary turbines and particularly to gas turbines with high speed action the arrangement necessarily employs an epicyclic train one element of which is integral with the crank shaft or the rotor shaft and another element is integral with the reception shaft, the third element bears on the assembly of the globical wheel, endless screw, as in the previous examples and transmits thereto in the same conditions the reaction of the couple, the pivotal movement of the casing also acts in identical manner on the driving members of the reducing agent with its variable element or auxiliary motor.

I claim:

1. In automatic demultiplying apparatus, an oscillatable casing, a worm mounted within said casing, means carrying said worm, a secondary shaft, means for supporting said secondary shaft, a worm wheel mounted on said secondary shaft, said worm wheel being engaged by said worm, said casing oscillating about said secondary shaft, a main shaft, a tubular shaft concentric with said main shaft and means gearing said tubular shaft with said secondary shaft.

2. In automatic demultiplying apparatus, an oscillatable casing, said casing being oscillated by a resistance couple, a worm mounted within said casing, a secondary shaft, means supporting said secondary shaft, a worm wheel carried by said secondary shaft, said worm wheel being engaged by said worm, said casing oscillating about said secondary shaft, means controlling the oscillation of said casing for varying the speed of the worm, a motor shaft, a tubular shaft mounted concentrically on the motor shaft, a gear wheel carried by the secondary shaft and a gear wheel carried by the tubular shaft, said gear wheels engaging.

3. In automatic demultiplying apparatus as claimed in claim 1 an arm carried by the oscillatable casing, a spring anchored at one end to said arm, a frame for anchoring the other end of said spring, and means for adjusting the tension of said spring, said spring acting on said arm to serve as a counterweight.

4. In automatic demultiplying apparatus as claimed in claim 1, a lever, said lever being mounted upon the secondary shaft for moving the oscillatable casing against the spring for actuating the reducing gear.

MARCEL DE LADERRIÈRE.